W. G. WOOD.
HEADLIGHT.
APPLICATION FILED DEC. 24, 1919.
1,395,026.
Patented Oct. 25, 1921.
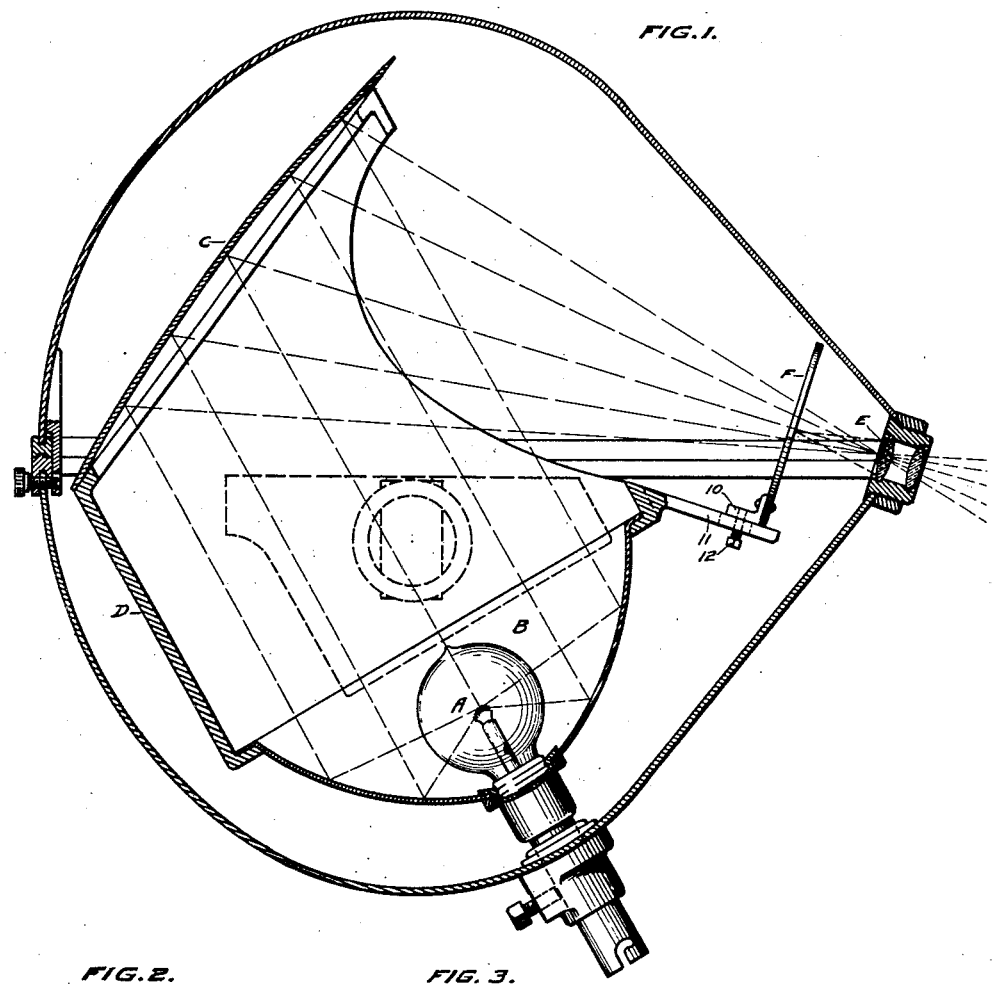
INVENTOR
WILLIAM G. WOOD

UNITED STATES PATENT OFFICE.

WILLIAM G. WOOD, OF SAN FRANCISCO, CALIFORNIA, ASSIGNOR TO BERKELEY LIGHT CORPORATION, OF SAN FRANCISCO, CALIFORNIA, A CORPORATION OF NEVADA.

HEADLIGHT.

1,395,026.  Specification of Letters Patent.  Patented Oct. 25, 1921.

Application filed December 24, 1919. Serial No. 347,180.

*To all whom it may concern:*

Be it known that I, WILLIAM G. WOOD, a citizen of the United States, residing at San Francisco, in the county of San Francisco and State of California, have invented new and useful Improvements in Headlights, of which the following is a specification.

This invention relates to headlights or projectors of the type shown and described in my application, Serial No. 248,303, filed August 5, 1918, and the present application is in the nature of a continuation in part of my application, Serial No. 249,968 filed August 15, 1918.

In said application, Serial No. 248,303, a cone-shaped beam having a minimum of aberration is produced by reflecting light from a source in the form of parallel rays and providing means to receive and project the parallel rays in the form of a cone-shaped beam. It is the object of the present invention to sharpen the outline of the projected beam and to intensify the field of light. This I accomplish by placing an objective glass or lens in the front of the lamp housing where the rays of the cone-shaped beam converge and then locate a diaphragm at the principal focal point of the objective lens, said diaphragm having an aperture in it whose greatest dimension is less than the diameter of the cone-shaped beam at that point. Thereby, I am enabled to obtain a beam which, when projected on a screen or other light reflecting surface, gives a field of light which will be an exact image of the aperture in the diaphragm and which will be uniform in intensity and sharp in outline.

Forms which my invention may assume are exemplified in the following description and illustrated in the accompanying drawings in which:

Figure 1 shows a vertical central sectional view of a lamp embodying my invention.

Fig. 2 shows a detached view of one form of the diaphragm.

Fig. 3 shows a similar view of a modified form of diaphragm.

In the drawings I show an arrangement of reflectors similar to those shown in application Serial No. 248,303, although it is to be understood that any instruments capable of producing a cone-shaped beam may be employed. It is preferable, however, to employ means which will reduce the spherical aberration to a minimum. A is a source of light, B is a parabolic reflector, and C a section or portion of a paraboloid, said parts being contained within a housing D of suitable form. The parallel rays from B are reflected by C in the form of a cone-shaped beam. In the front of the housing, at the point where the rays of the cone-shaped beam cross, I place an objective glass or lens E whose focal length may vary according to the particular effect desired. At the principal focal point of the objective lens, I place a diaphragm F formed with an aperture G whose greatest dimension is slightly less than the diameter of the cone-shaped beam at that point. The shape of this aperture G may vary, and in Fig. 2 I show a segmental opening and in Fig. 3 a star-shaped opening.

With the diaphragm F in proper focus, the beam projected on a screen or other light reflecting surface at a distance in front of the lamp will exactly image the shape of the aperture in said diaphragm and will be of uniform intensity and sharp outline, inasmuch as the aperture being somewhat reduced in size from the cross sectional area of the beam at that point will have the effect of cutting out stray and faint rays at the margin of the beam. In an automobile headlight, I find it desirable to use an aperture shaped like that shown in Fig. 2 which is a segment of a circle with the bottom part blocked off so that the image, which is always an inverted one, will be approximately flat on top when projected out from the lamp. The lamp is so positioned on the automobile that the uppermost rays of the projected beam are approximately horizontal and of a height conforming to existing regulations, to wit, less than 42 inches. For other purposes, it may be desirable to use diaphragms having apertures of a different shape, for instance, square, oval, or in the form of a star. The field of light projected from the lamp will always be in the form of the aperture in the diaphragm F.

The diaphragm F is shown as mounted upon the reflector B, and it may, if desired, be adjustable so as to keep it in proper focus. The adjustment here shown consists of a plate 10 slidably mounted on a support 11, which latter serves to connect the two reflectors B and C together and retain them in proper position. The plate 10 is held in adjusted position by means of a clamping screw 12.

If the source A were really a point source, and all aberration due to imperfections of manufacture could be eliminated in the reflectors B and C, then the objective lens E could be omitted and the shadow cast by the apertured diaphragm would be exactly like the image which is projected by the objective lens. By using the objective lens, instruments of less exactness may be employed to produce the cone-shaped beam, it being sufficient merely if the rays of said cone-shaped beam cross somewhere along the principal optical axis of the lens.

Various changes in the construction and arrangement of the several parts may be employed without departing from the spirit of my invention as disclosed in the appended claims.

Having thus described my invention, what I claim and desire to secure by Letters Patent is:

1. In a headlight, a lamp housing having a reduced light emitting aperture, a source of light in said housing, means coöperating with the source of light for forming a cone-shaped beam, an objective lens positioned in the light emitting aperture where the rays of the beam cross, and a diaphragm positioned at the principal focal point of the objective lens, said diaphragm having an aperture whose greatset dimension is less than the diameter of the cone-shaped beam at that point, whereby stray and faint rays at the margin of the cone-shaped beam will be cut out and the field of light projected will be an image of the aperture in said diaphragm, the shape of the aperture in said diaphragm being such as to produce a beam of light having its upper part segmental in form and extending parallel to the field to be illuminated.

2. In a headlight, a source of light, a reflector to project parallel rays therefrom, a second reflector to receive the parallel rays and project them in the form of a converging beam, and a diaphragm positioned between the second reflector and the focal point of the cone-shaped beam, said diaphragm being provided with an aperture whose greatest dimension is less than the diameter of the cone-shaped beam at that point, whereby the faint and stray rays at the margin of the converging beam will be cut out and the projected beam will continue out in sharp outline.

3. In a headlight, a housing, a source of light therein, means for projecting a substantial portion of the rays therefrom in a converging beam, an objective lens in the front of the housing where the converging rays cross, and a diaphragm positioned between the projecting means and lens at the principal focal point of the latter, said diaphragm having an aperture of smaller size than the cross-sectional area of the projected beam at that point, whereby faint and stray rays at the margin of the beam are cut out and a field of light is produced outside of the housing which is an image of the aperture in the diaphragm.

In testimony whereof I have hereunto set my hand in the presence of two subscribing witnesses.

WILLIAM G. WOOD.

Witnesses:
W. W. HEALEY,
VALERIE DE REMER.